US011196572B2

(12) United States Patent
Ding et al.

(10) Patent No.: US 11,196,572 B2
(45) Date of Patent: *Dec. 7, 2021

(54) BLOCKCHAIN-BASED CONTENT VERIFICATION

(71) Applicant: Advanced New Technologies Co., Ltd., Grand Cayman (KY)

(72) Inventors: Wei Ding, Hangzhou (CN); Zhiguo Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,490

(22) Filed: Apr. 20, 2021

(65) Prior Publication Data

US 2021/0243039 A1 Aug. 5, 2021

Related U.S. Application Data

(63) Continuation of application No. 16/888,329, filed on May 29, 2020, which is a continuation of application No. PCT/CN2019/079896, filed on Mar. 27, 2019.

(30) Foreign Application Priority Data

Jun. 26, 2018 (CN) .......................... 201810671624.4

(51) Int. Cl.
*H04L 9/32* (2006.01)
*G06F 16/182* (2019.01)
(Continued)

(52) U.S. Cl.
CPC .......... *H04L 9/3265* (2013.01); *G06F 16/137* (2019.01); *G06F 16/1837* (2019.01); *H04L 9/0637* (2013.01); *H04L 9/3239* (2013.01)

(58) Field of Classification Search
CPC ... H04L 9/3265; H04L 9/0637; H04L 9/3239; G06F 16/1837; G06F 16/137
See application file for complete search history.

(56) References Cited

U.S. PATENT DOCUMENTS 10,425,230 B1 9/2019 Tang
11,055,703 B2 * 7/2021 Kondo ................. G06Q 20/382
(Continued)

FOREIGN PATENT DOCUMENTS

CN 106204287 12/2016
CN 106559211 4/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Baotran N To
(74) *Attorney, Agent, or Firm* — Fish & Richardson P.C.

(57) ABSTRACT

This disclosure relates to blockchain-based content verification. In one aspect, a method includes receiving, from a client device of a signer, a target transaction request for triggering presentation of a target electronic document. A smart contract for content verification of the target electronic document is invoked in response to receiving the target transaction request. A content verification program declared in the smart contract is executed. The executing includes reading content of the target electronic document from a blockchain and performing content verification on the target electronic document based on the content of the target electronic document read from the blockchain. A content
(Continued)

verification result and the content of the target electronic document is returned to the client device for presentation to the signer.

21 Claims, 5 Drawing Sheets

(51) Int. Cl.
*G06F 16/13* (2019.01)
*H04L 9/06* (2006.01)

(56) References Cited

U.S. PATENT DOCUMENTS

| | | | |
|---|---|---|---|
| 2017/0220815 A1* | 8/2017 | Ansari | G06Q 20/389 |
| 2018/0096349 A1* | 4/2018 | Mcdonald | G06Q 20/102 |
| 2018/0365686 A1 | 12/2018 | Kondo | |
| 2019/0386834 A1 | 12/2019 | Furukawa | |
| 2020/0295949 A1 | 9/2020 | Ding | |

FOREIGN PATENT DOCUMENTS

| | | |
|---|---|---|
| CN | 106960165 | 7/2017 |
| CN | 107508806 | 12/2017 |
| CN | 107657438 | 2/2018 |
| CN | 107844976 | 3/2018 |
| CN | 107994991 | 5/2018 |
| CN | 108898389 | 11/2018 |

OTHER PUBLICATIONS

International Search Report and Written Opinion in International Application No. PCT/CN2019/079896, dated Jul. 3, 2019, 11 pages (with partial English translation).

Nakamoto, "Bitcoin: A Peer-to-Peer Electronic Cash System," www.bitcoin.org, 2005, 9 pages.

PCT International Preliminary Report on Patentability in International Application No. PCT/CN2019/079896, dated Dec. 29, 2020, 10 pages.

* cited by examiner

BLOCKCHAIN-BASED CONTENT VERIFICATION

CROSS-REFERENCE TO RELATED APPLICATIONS

This application is a continuation of U.S. patent application Ser. No. 16/888,329, filed on May 29, 2020, which is a continuation of PCT Application No. PCT/CN2019/079896, filed on Mar. 27, 2019, which claims priority to Chinese Patent Application No. 201810671624.4, filed on Jun. 26, 2018, and each application is hereby incorporated by reference in its entirety.

TECHNICAL FIELD

One or more implementations of the present specification relate to the blockchain field, and in particular, to content verification.

BACKGROUND

Blockchain technology, also referred to as a distributed ledger technology, is a new technology in which several computing devices participate in "accounting" to maintain a complete distributed database. The blockchain technology has been widely used in many fields because of its features such as decentralization, openness and transparency, and participation of each computing device in recording data in a database, and fast data synchronization between computing devices.

SUMMARY

The present specification provides a blockchain-based content verification method, including: receiving a target transaction initiated by a signer through a client, where the target transaction is used to trigger online presentation of a target electronic document; invoking a smart contract corresponding to content verification in response to the target transaction, executing a content verification program declared in the smart contract, and reading original content of the target electronic document from a blockchain; and performing content verification on the target electronic document based on the read original content of the target electronic document, and returning a content verification result and the original content of the target electronic document to the client for presentation to the signer.

Optionally, the target transaction indicates that the signer has passed identity authentication.

Optionally, the original content of the target electronic document stored in the blockchain is preset with an access right for restricting access to a user account other than the smart contract.

Optionally, the blockchain includes a main chain and a plurality of child chains; and the plurality of child chains include a first child chain for storing an access address and summary information of the target electronic document uploaded by a contract drafter, and a second child chain for storing the original content of the target electronic document; and reading original content of the target electronic document from a blockchain includes: reading an access address of the target electronic document from the first child chain; and reading the original content of the target electronic document from the second child chain based on the access address of the target electronic document.

Optionally, performing content verification on the target electronic document based on the read original content of the target electronic document includes: calculating summary information of the read original content of the target electronic document; and matching calculated summary information with the summary information of the target electronic document read from the first child chain; if the two match, determining that the target electronic document has passed content verification; or if the two do not match, determining that the target electronic document has not passed the content verification.

Optionally, the plurality of child chains further include a third child chain for storing a CA certificate corresponding to the signer, where the CA certificate is preset with an access right for restricting access to a user account other than the signer.

Optionally, the target electronic document is an electronic contract.

The present specification provides a blockchain-based content verification apparatus, including: a receiving module, configured to receive a target transaction initiated by a signer through a client, where the target transaction is used to trigger online presentation of a target electronic document; and a verification module, configured to: invoke a smart contract corresponding to content verification in response to the target transaction, execute a content verification program declared in the smart contract, and read original content of the target electronic document from a blockchain; and perform content verification on the target electronic document based on the read original content of the target electronic document, and return a content verification result and the original content of the target electronic document to the client for presentation to the signer.

Optionally, the target transaction indicates that the signer has passed identity authentication.

Optionally, the original content of the target electronic document stored in the blockchain is preset with an access right for restricting access to a user account other than the smart contract.

Optionally, the blockchain includes a main chain and a plurality of child chains; and the plurality of child chains include a first child chain for storing an access address and summary information of the target electronic document uploaded by a contract drafter, and a second child chain for storing the original content of the target electronic document; and the verification module is configured to: read an access address of the target electronic document from the first child chain; and read the original content of the target electronic document from the second child chain based on the access address of the target electronic document.

Optionally, the verification module is further configured to: calculate summary information of the read original content of the target electronic document; and match calculated summary information with the summary information of the target electronic document read from the first child chain; if the two match, determine that the target electronic document has passed content verification; or if the two do not match, determine that the target electronic document has not passed the content verification.

Optionally, the plurality of child chains further include a third child chain for storing a CA certificate corresponding to the signer, where the CA certificate is preset with an access right for restricting access to a user account other than the signer.

Optionally, the target electronic document is an electronic contract.

The present specification further provides an electronic device, including: a processor; and a memory, configured to store machine executable instructions; where by reading and executing the machine executable instructions that are stored in the memory and that correspond to a control logic for blockchain-based content verification, the processor is enabled to: receive a target transaction initiated by a signer through a client, where the target transaction is used to trigger an electronic signature operation on the target electronic document; and pre-store a CA certificate corresponding to the signer in a blockchain; invoke a smart contract corresponding to an electronic signature in response to the target transaction, execute an electronic signature program declared in the smart contract, and read the CA certificate corresponding to the signer from the blockchain; and perform an electronic signature operation on the target electronic document based on the CA certificate.

According to the previously described technical solution, the user can trigger, by invoking a smart contract, the smart contract to read the original content of the electronic document from the blockchain, verify the content of the electronic document based on the read original content of the electronic document, and return the content verification result and the original content of the electronic document to the signer for presentation. Therefore, before the signer signs the electronic document online, it can be determined whether or not the content of the electronic document to be signed is tampered with, thereby improving the security level when the electronic document is signed online.

DESCRIPTION OF IMPLEMENTATIONS

The present description is intended to provide a technical solution in which a signer, when signing an electronic document published in a blockchain online, performs content verification on the electronic document to be signed by invoking a smart contract deployed in the blockchain, so as to determine whether the electronic document to be signed is tampered with.

During implementation, a smart contract for online presentation of the electronic document can be deployed in advance in the blockchain, and a verification program for content verification of the original content of the electronic document is declared in the smart contract.

When a signer needs to sign an electronic document published in a blockchain online, the signer can initiate a transaction for triggering online presentation of the electronic document through a client. After receiving the transaction, a node device in the blockchain can initiate invocation of the smart contract, execute a verification program declared in the smart contract, read the original content of the electronic document from the blockchain, perform content verification on the electronic document to be signed based on the read original content of the electronic document, and then return the read original content of the electronic document and the result of the content verification to the signer for presentation.

According to the previously described technical solution, the user can trigger, by invoking a smart contract, the smart contract to read the original content of the electronic document from the blockchain, verify the content of the electronic document based on the read original content of the electronic document, and return the content verification result and the original content of the electronic document to the signer for presentation. Therefore, before the signer signs the electronic document online, it can be determined whether or not the content of the electronic document to be signed is tampered with, thereby improving the security level when the electronic document is signed online.

The following describes the present specification by using the implementations and with reference to the specific application scenarios.

Figure 1:
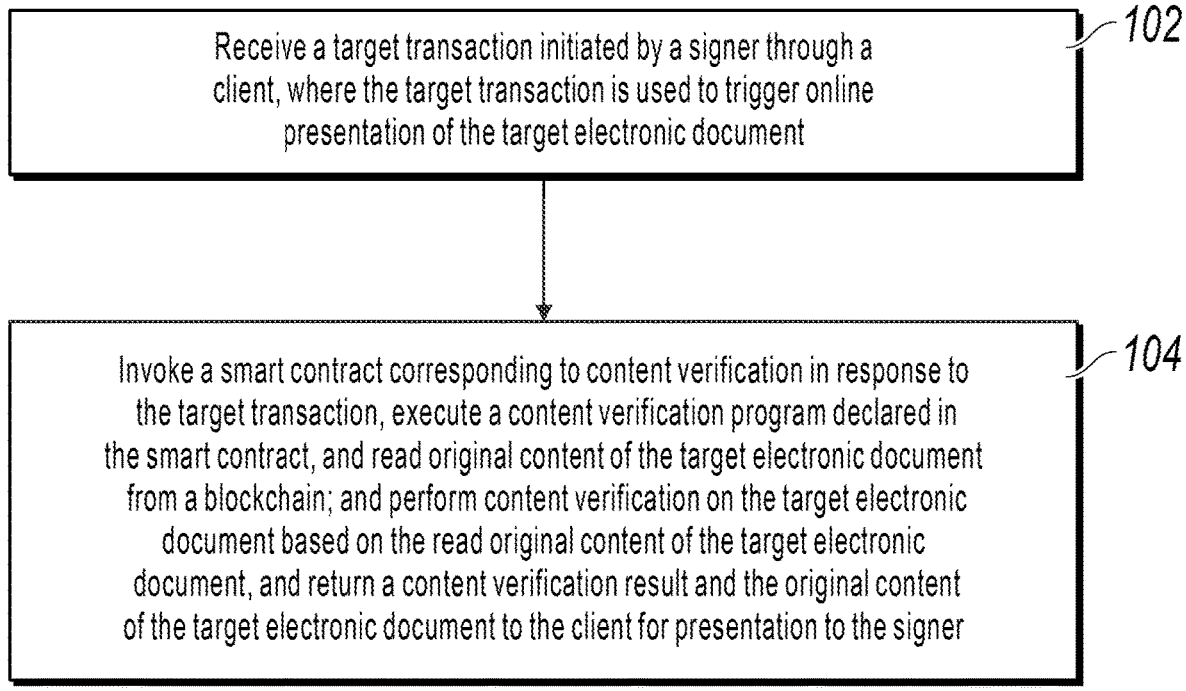
FIG. 1 is a schematic diagram illustrating a blockchain-based content verification method, according to an example implementation.

Referring to FIG. 1, FIG. 1 illustrates a blockchain-based content verification method, according to an implementation of the present specification. The method is applied to a node device in a blockchain and includes the following steps:

Step 102: Receive a target transaction initiated by a signer through a client, where the target transaction is used to trigger online presentation of the target electronic document.

Step 104: Invoke a smart contract corresponding to content verification in response to the target transaction, execute a content verification program declared in the smart contract, and read original content of the target electronic document from a blockchain; and perform content verification on the target electronic document based on the read original content of the target electronic document, and return a content verification result and the original content of the target electronic document to the client for presentation to the signer.

The blockchain described in the present specification can specifically include any type of blockchain network. For example, in actual applications, the blockchain can be any one of a public blockchain, a private blockchain, and a consortium blockchain.

For example, in an illustrated implementation, the previously described blockchain network can be in particular a consortium blockchain including a main chain and a plurality of child chains.

It is worthwhile to note that the transaction described in the present specification refers to a group of data that is created by a user through a blockchain client and that needs to be finally sent to the blockchain.

A transaction in the blockchain has a narrow sense and a broad sense. A transaction in a narrow sense refers to a value transfer initiated to a user to the blockchain. For example, in a conventional bitcoin blockchain network, a transaction can be a transfer initiated by a user in the blockchain. A transaction in a broad sense refers to a group of service data that is issued by a user to the blockchain and that includes a service intention. For example, an operator can build a consortium blockchain based on actual service needs, and deploy some other types of online services unrelated to value transfer based on the consortium blockchain, such as house renting service, vehicle dispatching service, insurance claim settlement service, credit service, and medical service. In such a consortium blockchain, a transaction can be a service message or service request that is issued by a user in the consortium blockchain and that includes a service intention.

The target transaction refers to an invocation message or an invocation request created by a user through a client for triggering invocation of a smart contract deployed in a blockchain.

The electronic document can include any form of text to be signed in a digital form. For example, in an example, the electronic document can be specifically an electronic contract.

In the present specification, a signer can request a certificate authority (CA) certificate from a CA based on personal identity information. After receiving the CA certificate request of the signer, the CA can authenticate the signer based on the identity information submitted by the signer, and can issue the CA certificate to the signer after the identity authentication is passed.

A specific process in which a signer requests a CA certificate from a CA is omitted in the present specification for simplicity.

For example, in actual applications, the signer requests the CA certificate by submitting the identity information to the CA. After successfully verifying the identity information of the signer, the CA can allocate a public key/private key pair to the signer; and after binding the allocated public key/private key pair with the identity information of the signer, the CA performs an electronic signature operation by using the private key held by the CA to form the CA certificate, and then issues the CA certificate to the signer.

In the present specification, the CA certificate issued to a signer can be published to a blockchain and stored in a distributed database of the blockchain.

In an example, after a CA certificate is issued to a signer, the signer can publish the CA certificate (the CA certificate is carried in a transaction in the form of a ciphertext) in the blockchain in a form of transaction through a client, and a node device in the blockchain can initiate consensus processing of the CA certificate after receiving the CA certificate, and store the CA certificate in a distributed database of the blockchain after the consensus is passed.

In an illustrated implementation, to improve usage security of the CA certificate of the signer, after the CA certificate that is issued by the CA to the signer is successfully stored in the distributed database of the blockchain by consensus processing, an access right can be set for the CA certificate stored in the blockchain to restrict access to a user account other than the signer.

That is, by setting the access right for the CA certificate stored in the blockchain, it is ensured that only the signer has the right to access the CA certificate stored in the blockchain, so as to view and operate the CA certificate.

For example, during implementation, an access right list can be pre-configured for the CA certificate stored in the blockchain, and the identity information of the signer is written into the access right list to indicate that only the signer has the access right for the CA certificate; for example, in the blockchain, the identity of the user is indicated by using the public key of the signer or public key derivative data (such as the account address obtained by calculating the public key). Therefore, the public key or the public key derivative data of the signer can be configured as an authorized identity for uniquely accessing the CA certificate.

In the present specification, an operator of a blockchain can deploy an online service for electronically signing an electronic document stored in the blockchain, so that when signing the electronic document, a signer can complete the electronic signature operation on the electronic document in the blockchain online, instead of manually performing an electronic signature operation on the electronic document based on a private key held by the signer.

During implementation, the operator of the blockchain can develop a smart contract for performing an online electronic signature operation on an electronic document in the blockchain, where an electronic signature program for performing an electronic signature operation on the electronic document is declared in the smart contract.

In particular, the electronic signature program can be program code (such as some invocable program methods or functions) associated with the execution logic of the electronic signature operation on the electronic document declared in the smart contract.

For the above developed smart contract, the operator of the blockchain can issue the smart contract to the blockchain through any node device in the blockchain. The node device in the blockchain can initiate consensus processing on the smart contract after receiving the smart contract, and store the smart contract in the distributed database of the blockchain after the consensus is passed.

Subsequently, the signer can issue a target transaction for triggering an electronic signature operation on the target electronic document to the blockchain by accessing any node device in the blockchain through the client, so as to initiate invocation of a deployed smart contract, and trigger an electronic signature program declared in the smart contract to perform the electronic signature operation on the target electronic document online.

In the present specification, the operator of the blockchain can deploy an online service for electronically signing an electronic document stored in the blockchain on the basis of the blockchain, and can deploy an online service for triggering online presentation of the electronic document stored in the blockchain on the basis of the blockchain.

During implementation, the operator of the blockchain can develop a smart contract for online presentation of an electronic document in the blockchain, where a verification program for content verification of the electronic document is declared in the smart contract.

In particular, the verification program can be program code that is declared in the smart contract and that is related to execution logic for performing a verification operation on the original content of the electronic document.

For the above developed smart contract, the operator of the blockchain can still issue the smart contract to the blockchain through any node device in the blockchain. The node device in the blockchain can initiate consensus processing on the smart contract after receiving the smart contract, and store the smart contract in the distributed database of the blockchain after the consensus is passed.

Subsequently, the signer can issue a target transaction for triggering online presentation of the target electronic document to the blockchain by accessing any node device in the blockchain through the client, so as to initiate invocation of the smart contract that has been deployed, trigger execution of a verification program declared in the smart contract, verify the content of the target electronic document, and return the target electronic document and a content verification result (for example, whether the content of the electronic document is tampered with) to the client after the content verification is passed.

Figure 3:
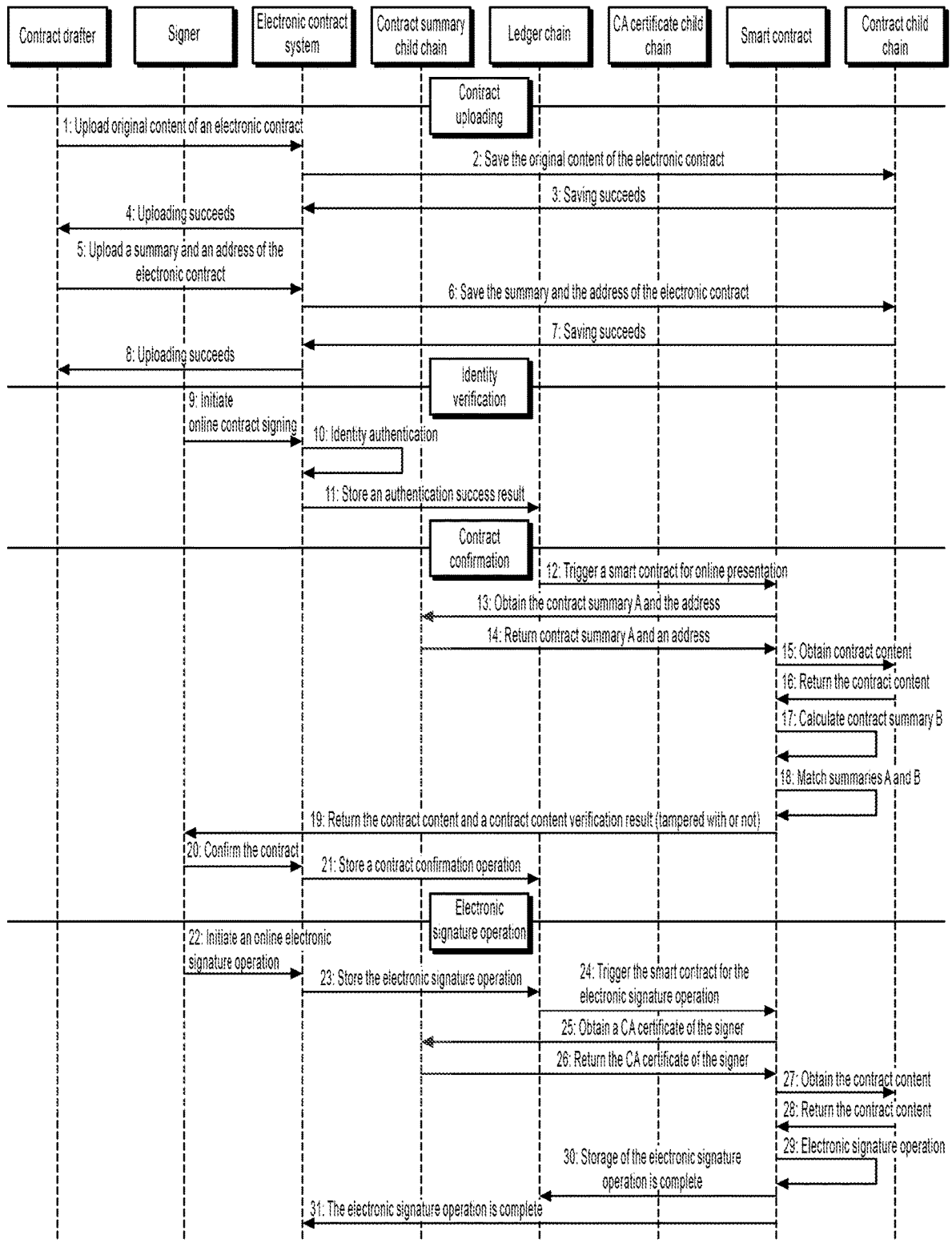
FIG. 3 is a flowchart illustrating signing an electronic document by a signer, according to an example implementation.

It is worthwhile to note that, in actual applications, the previously described smart contract for performing an online electronic signature operation on an electronic document in a blockchain and the smart contract for online presentation of an electronic document in a blockchain can be integrated into one smart contract for deployment in a blockchain (as shown in FIG. 3, the two smart contracts are integrated into one smart contract), or can be deployed in a blockchain as two different smart contracts. This is not specifically limited in the present specification.

An example of an electronic contract to be signed by the previously described target electronic document is described below.

In an illustrated implementation, the "main chain-child chain" architecture that can be used in the blockchain can include a main chain and a plurality of child chains. The quantity of child chains in the blockchain network can be planned based on actual service needs, and is not limited in the present specification.

Figure 2:
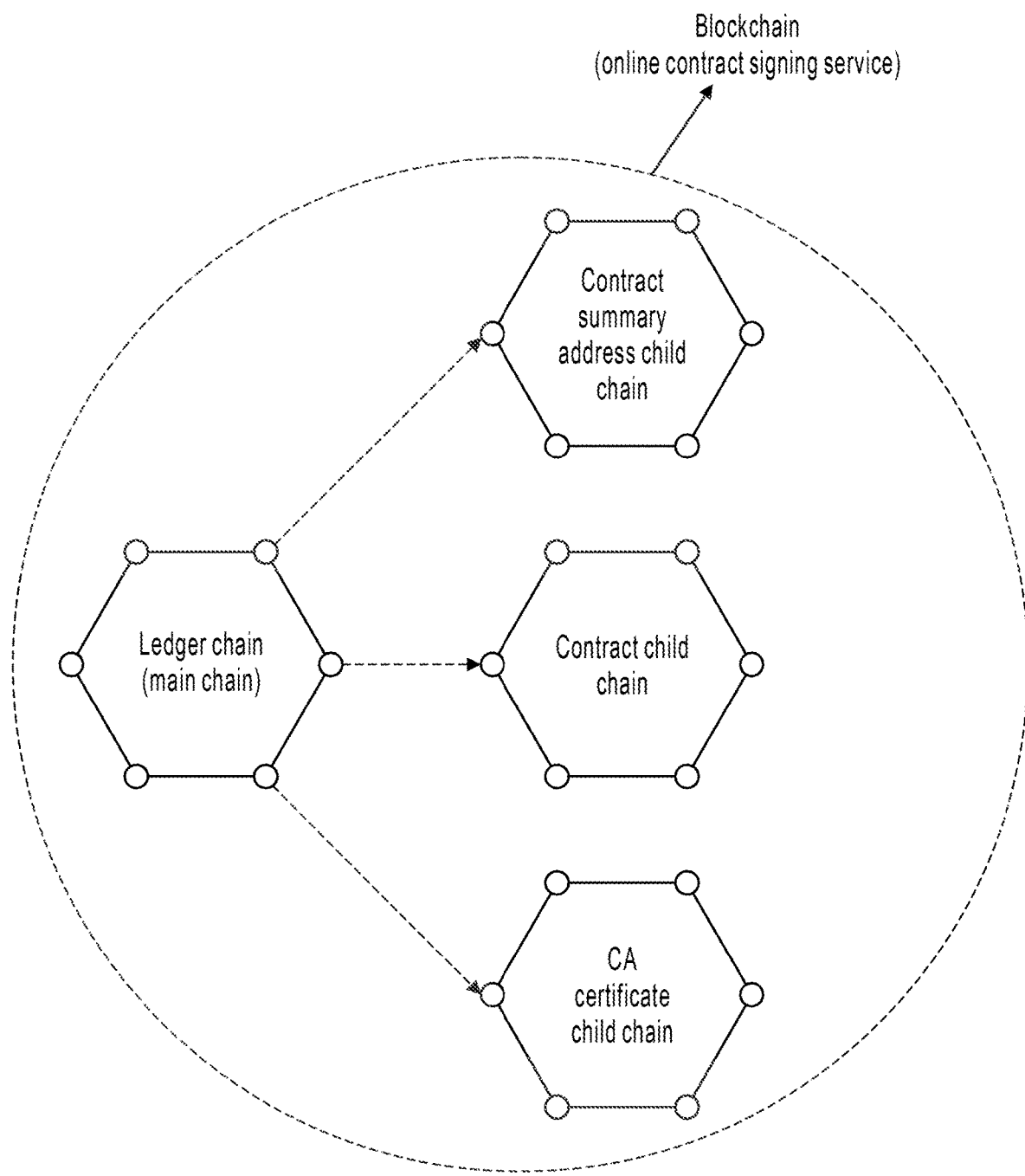
FIG. 2 is an architectural diagram illustrating a blockchain, according to an example implementation.

Referring to FIG. 2, FIG. 2 is an architectural diagram illustrating a blockchain, according to the present specification.

As shown in FIG. 2, in an illustrated implementation, the blockchain can be divided into "ledger chain", "contract summary child chain" (first child chain), "contract child chain" (second child chain), and "CA certificate child chain" (third child chain).

The ledger chain can be a main chain of the blockchain; That is, the main chain of the blockchain can be used as a ledger chain for storing transaction data related to a series of operations performed by the signer in the blockchain, so as to trace the operation behavior of the signer in the future. The smart contract deployed by the operator of the blockchain can be stored in the main chain after the consensus is passed.

The contract summary child chain is used to store summary data (a hash value obtained by hashing the contract content) of the electronic contract and an access address of the original content of the electronic contract.

The contract child chain is used to store the original content of the electronic contract.

In an illustrated implementation, to improve data security of the original content of the electronic contract, an access right can be set for the original content of the electronic contract stored in the blockchain to restrict access to a user account other than the smart contract. That is, by setting the access right for the original content of the electronic contract stored in the blockchain, it is ensured that only the smart contract has the right to access the original content of the electronic contract stored in the blockchain, so as to view and operate the original content of the electronic contract.

The CA certificate child chain is used to store the CA certificate issued by the CA authority to the signer.

It is worthwhile to note that the previously described child chain dividing method is merely an example. In actual applications, each child chain shown above can be further divided based on actual needs, or multiple child chains shown above can be combined.

For example, the contract summary child chain can be further divided into a "contract summary child chain" and a "contract address child chain", the contract summary child chain is used to store summary information of an electronic contract, and the contract address child chain is used to store an access address of an electronic contract. For another example, the contract summary child chain and the contract child chain can be combined into one child chain, and the summary information, the access address, and the original content of the electronic contract are stored in the child chain.

The process of signing an electronic document by a signer is described in detail based on the architecture of the blockchain shown in FIG. 2.

Referring to FIG. 3, FIG. 3 is a flowchart illustrating signing an electronic document by a signer, according to an example implementation.

As shown in FIG. 3, the signing process of the electronic document shown in the present specification can be divided into four stages: electronic contract uploading, signer identity authentication, signer contract confirmation, and signer electronic signature operation.

1) Electronic Contract Uploading

As shown in FIG. 3, after drafting an electronic contract, a drafter of the electronic contract can perform the following operations:

On one hand, the original content of the electronic contract can be uploaded to the electronic contract system through the client, and the electronic contract system can further publish the original content of the electronic contract in the contract child chain in the form of a transaction (the original content of the electronic contract is carried in the transaction in the form of a ciphertext); and the node device in the contract child chain can initiate consensus processing on the original content of the electronic contract after receiving the original content of the electronic contract, and store the original content of the electronic contract in the distributed database of the contract child chain after the consensus is passed.

When the original content of the electronic contract is successfully stored in the distributed database of the contract child chain, the contract child chain can return a notification message indicating successful storage in the electronic contract system, and return the access address of the original content of the electronic contract in the contract child chain to the electronic contract system. After receiving feedback from the contract child chain, the electronic contract system can return an upload success notification message to the client, and further return the access address of the original content of the electronic contract in the contract child chain to the client.

For example, the access address of the original content of the electronic contract can include information such as a hash value of a transaction including the original content of the electronic contract and a block number of a block including the transaction.

In an illustrated implementation, to improve usage security of the electronic document, after the original content of the electronic document is successfully stored in the distributed database of the previously described ledger chain through consensus processing, an access right can be set for the original content of the electronic document stored in the blockchain, so as to restrict access to a user account other than the previously described smart contract.

That is, by setting the access right for the electronic document stored in the blockchain, it is ensured that only the smart contract deployed in the chain has the right to access the original content of the electronic document stored in the blockchain, so as to view and operate the original content of the electronic document.

The specific process of setting the access right for the original content of the electronic document stored in the blockchain is omitted for simplicity.

On the other hand, after the drafter of the electronic contract receives the access address of the original content of the electronic contract returned by the contract child chain through the client, the drafter of the electronic contract can calculate the summary information of the electronic contract through the client, and upload the summary information of the electronic contract to the electronic contract system. The electronic contract system can further publish the summary information of the electronic contract and the access address of the electronic contract in the contract summary child chain in the form of a transaction (both carried in the transaction in the form of a ciphertext). After receiving the summary information of the electronic contract and the access address of the electronic contract, the node device in the contract summary child chain can initiate consensus processing on the summary information of the electronic contract and the access address of the electronic contract, and store the summary information of the electronic contract and the access address of the electronic contract in the distributed database of the contract summary child chain after the consensus is passed.

When the summary information of the electronic contract and the access address of the electronic contract are successfully stored in the distributed database of the contract summary child chain, the contract summary child chain can also return a notification message indicating successful storage in the electronic contract system, and return the summary information of the electronic contract and the access address of the electronic contract in the contract summary child chain to the electronic contract system. After receiving feedback from the contract summary child chain, the electronic contract system can further return an upload success notification message to the client, and further return the summary information of the electronic contract and the access address of the electronic contract in the contract summary child chain to the client.

At this time, the drafter of the electronic contract successfully stores the original content of the electronic contract, the summary information of the electronic contract, and the access address of the electronic contract in different child chains.

2) Signer Identity Authentication

As shown in FIG. 3, a signer can send a contract signing request to the electronic contract system through a client to initiate online signing of the electronic contract. After receiving the contract signing request, the electronic contract system can authenticate the signer in response to the contract signing request.

A specific method for authenticating an identity of a signer is not specifically limited in the present specification.

For example, in response to the contract signing request, an electronic signature operation can be performed based on the private key held by the signer, and the electronic contract system can verify the electronic signature of the contract signing request based on the public key corresponding to the private key held by the signer to determine whether the contract signing request is a contract signing request initiated by the signer that holds the private key. Of course, in actual applications, identity of the signer can be authenticated by using other authentication techniques such as face recognition, which are not listed in the present specification.

After the electronic contract system completes identity authentication of the signer, an authentication record indicating that the signer has passed the identity authentication can be generated, a transaction is created based on the generated authentication record, and then the transaction is issued in the ledger chain (that is, the main chain), to initiate invocation of a smart contract that has been deployed and that is used for online presentation of the electronic contract in the blockchain, so as to trigger online presentation of the electronic contract to be signed.

After receiving the transaction, the node device in the ledger chain can initiate consensus processing of the transaction, store the transaction in a distributed database of the ledger chain for ledger storage, and then return the access address of the transaction in the ledger chain to the electronic contract system. Subsequently, the electronic contract system can perform a tracing query on the identity authentication result of the signer based on the access address of the transaction in the ledger chain.

3) Signer Contract Confirmation

Still referring to FIG. 3, after the transaction created by the electronic contract system based on the electronic signature request passes the consensus and the ledger is stored in the ledger chain, the node device in the ledger chain can immediately trigger invocation of the smart contract that has been deployed and that is used for online presentation of the electronic contract in the blockchain, and execute the verification program declared in the smart contract to verify the original content of the electronic contract, so as to determine whether the original content of the electronic contract is tampered with.

In an illustrated implementation, before invocation of the smart contract is triggered, it is first determined whether the transaction is successfully stored in the ledger chain. If the transaction is successfully stored in the ledger chain, invocation of the smart contract is initiated. That is, invocation of the smart contract is triggered only after the transaction initiated by the user for triggering the online presentation of the electronic contract is stored in the ledger chain.

In the present specification, during execution of the verification program for the smart contract, the summary information of the electronic document and the access address of the electronic document can be first read from the contract summary child chain.

For example, the transaction can carry the summary information of the electronic contract and the access address of the electronic contract in the contract summary child chain, the summary information and the access address of the electronic contract can be read from the contract summary child chain for the smart contract based on the access address. Then, the original content of the electronic contract can be read from the contract child chain based on the access address of the electronic contract.

For example, for the smart contract, a transaction for querying the original content of the electronic contract can be created, and the transaction can be electronically signed based on the held private key. In the contract child chain, the public key of the smart contract can be configured as an authorized public key with an access right. After receiving the transaction, the node device in the contract child chain can verify the electronic signature of the transaction based on the authorized public key. If the verification is passed, it indicates that the smart contract is authorized to access the original content of the electronic contract stored in the contract child chain, and can normally respond to the transaction, and the original content of the electronic contract to be queried can be returned to the smart contract.

Further, after the original content of the electronic contract is read from the contract child chain, summary information of the read original content of the electronic contract can be further calculated. For example, using the summary information as a hash value, a hash value corresponding to the original content of the read electronic contract can be obtained by re-performing a hash calculation on the original content of the read electronic contract based on a hash algorithm; then, the summary information of the original content of the electronic contract obtained through recalculation can be matched with the summary information of the electronic contract read from the contract summary child chain; if the recalculated summary information matches the summary information of the electronic contract read from the contract summary child chain, it indicates that the original content of the electronic contract read from the contract child chain is consistent with the original content of the electronic contract that is originally uploaded to the contract child chain by the contract drafter, and no tampering occurs. In this case, the original content of the electronic contract passes the content verification. Alternatively, if the recalculated summary information does not match the summary information of the electronic contract read from the contract summary child chain, it indicates that the original content of the electronic contract read from the contract child chain is inconsistent with the original content of the electronic contract that is originally uploaded to the contract child chain by the contract drafter, tampering occurs. In this case, the original content of the electronic contract does not pass the content verification.

After the content verification for the original content of the electronic contract is completed, for the smart contract, the read original content of the electronic contract and the content verification result for the original content of the electronic contract can be returned to the electronic contract system, and then the electronic contract system returns the original content of the electronic contract to the client of the signer for online presentation to the signer, and the signer confirms the original content of the presented electronic contract.

In this way, the signer can determine whether the content of the electronic contract to be signed is tampered with before the electronic contract is signed online, so that the electronic contract in which some content is tampered with can be prevented from being signed online, and the security level when the electronic document is signed online can be improved.

In the present specification, after the signer confirms the original content of the presented electronic contract, the signer can send a content confirmation message to the electronic contract system through the client. After receiving the content confirmation message, the electronic contract system can, in response to the content confirmation message, create a transaction based on the content confirmation message, and then issue the transaction in the ledger chain (that is, the main chain).

After receiving the transaction, the node device in the ledger chain can initiate consensus processing of the transaction, store the transaction in a distributed database of the ledger chain for ledger storage, and then return the access address of the transaction in the ledger chain to the electronic contract system. Subsequently, the electronic contract system can perform, based on the access address of the transaction in the ledger chain, a tracing query on the content confirmation operation that is performed by the signer on the electronic contract.

4) Signer Electronic Signature Operation

Referring to FIG. 3, after the signer confirms the original content of the electronic contract to be signed, and a confirmation ledger is successfully stored in the ledger chain, the signer can send an electronic signature request to the electronic contract system through the client to initiate an online electronic signature operation of the electronic contract.

After receiving the electronic signature request, the electronic contract system can create a transaction for triggering an electronic signature operation on the electronic contract based on the electronic signature request, and then issue the transaction in the ledger chain (that is, the main chain) to initiate invocation of a deployed smart contract for performing an online electronic signature operation on the electronic contract in the blockchain to trigger an online electronic signature operation on the electronic contract to be signed.

After receiving the transaction, the node device in the ledger chain can initiate consensus processing of the transaction, store the transaction in a distributed database of the ledger chain for ledger storage, and then return the access address of the transaction in the ledger chain to the electronic contract system. Subsequently, based on the access address of the transaction in the ledger chain, the electronic contract system can perform a tracing query on the current electronic signature operation of the electronic contract initiated by the signer on the electronic contract.

In an illustrated implementation, the electronic signature request can carry authorization information of the signer for electronically signing the electronic contract. Accordingly, the authorization information is also carried in the transaction that is created by the electronic contract system based the electronic signature request, where the authorization information is specifically used to indicate an access right for the CA certificate of the signer that has been stored in the CA certificate child chain, and authorize a smart contract that has been deployed in the blockchain and that is used for performing an electronic signature operation on the electronic contract.

It is worthwhile to note that the content form of the authorization information is not specifically limited in the present specification. For example, in actual applications, the authorization information can be an electronic certificate in any form for obtaining the access right for the CA certificate, for example, a character string, a password, or another verifiable electronic certificate.

Still referring to FIG. 3, after the transaction created by the electronic contract system based on the electronic signature request passes the consensus and the ledger is stored in the ledger chain, the node device in the ledger chain can immediately trigger invocation of the smart contract that has been deployed and that is used to perform an electronic signature operation on the electronic contract in the blockchain, and execute the electronic signature program declared in the smart contract to perform online electronic signature on the electronic contract.

In an illustrated implementation, before invocation of the smart contract is triggered, it is first determined whether the transaction carries the authorization information. If the transaction carries the authorization information, it indicates that the signer has granted the access right for the personal CA certificate stored in the CA certificate child chain to the smart contract (that is, the signer agrees to complete the electronic signature operation by the smart contract on behalf of the signer), and then the signer initiates invocation of the smart contract. That is, invocation of the smart contract is triggered only after the signer grants the access right for the personal CA certificate to the smart contract.

In another illustrated implementation, if the transaction carries the authorization information, it can be further determined whether the transaction is successfully stored in the ledger chain. If the transaction is successfully stored in the ledger chain, invocation of the smart contract is triggered. That is, invocation of the smart contract is triggered only after the signer grants the access right for the personal CA certificate to the smart contract and the transaction initiated by the user for triggering the electronic signature operation on the electronic contract completes the ledger storage in the ledger chain.

In the present specification, when the smart contract executes the electronic signature program, on the one hand, the original content of the electronic contract can be read from the contract child chain; For example, because the original content of the electronic contract stored in the contract child chain has access rights only for the smart contract deployed in the blockchain, the smart contract can normally read the original content of the electronic contract from the contract child chain.

On the other hand, the CA certificate of the signer can be read from the CA certificate child chain.

For example, for the smart contract, a transaction for querying a CA certificate can be created, where the transaction carries an electronic certificate as the authorization information, and then the transaction is issued in the CA certificate child chain. After receiving the transaction, the node device in the CA certificate child chain can verify the electronic certificate in the transaction to determine whether the smart contract has the access right to access the CA certificate of the signer. If the verification is passed, the CA certificate of the signer can be returned to the smart contract. That is, for the smart contract, the CA certificate can be read, based on the access right of the signer, from the CA certificate child chain by submitting the electronic certificate as the authorization information to the node device in the CA certificate child chain.

Of course, in actual applications, if the CA certificate of the signer is not stored in the CA certificate child chain, the CA certificate can be requested from the CA authority by using an authorized identity of the signer. Details are omitted for simplicity.

Further, after the original content of the electronic contract to be signed is read from the contract child chain, and the personal CA certificate of the signer is read from the CA certificate child chain, the electronic signature operation can be performed on the original content of the electronic contract based on the read CA certificate.

In an illustrated implementation, if the public key and private key of the signer are uniformly distributed by the CA, the CA certificate of the signer generally carries the public key/private key pair of the signer. In this case, an electronic signature operation can be performed on the original content of the electronic contract to be signed based on the private key carried in the CA certificate.

In another illustrated implementation, the public key and the private key of the signer are not uniformly distributed by the CA, but are generated by the signer autonomously. For example, a key generation algorithm is carried in a secure environment of a user client, or a key generation algorithm is carried in a secure hardware (such as a USB key) held by a user, a signer can create a private key/public key pair by triggering to run the above key generation algorithm. In this case, the CA certificate generally carries only the public key of the signer. The signer can encrypt the personal private key, and then separately submit the personal private key to the smart contract. For the smart contract, the private key of the signer can be decrypted, and then an electronic signature operation can be performed on the original content of the electronic contract to be signed based on the private key.

It should be emphasized that when the electronic signature operation is performed on the original content of the electronic contract based on the CA certificate, the CA certificate can also be carried as a load in the electronic signature. In this case, when the electronic signature of the signer needs to be verified, the CA certificate carried in the electronic signature can be decrypted based on the public key of the CA authority to obtain the public key of the signer, and then the electronic signature can be verified based on the public key of the signer, without the need to separately query the public key of the signer.

Still referring to FIG. 3, after the electronic signature operation is performed on the original content of the electronic signature, for the smart contract, a signature record indicating that the signer has completed the electronic signature operation on the electronic contract can be generated, a transaction can be created based on the signature record, and the transaction can be issued in the ledger chain; and after the node device in the ledger chain performs consensus processing on the transaction, the transaction can be stored in the ledger chain, so that the electronic contract system can subsequently perform a tracing query on the electronic signature operation that is performed on the electronic contract by the signer.

According to the previously described technical solution, on one hand, because the user can invoke a smart contract to trigger the smart contract to read a CA certificate corresponding to the signer from the blockchain, and perform an electronic signature operation on an electronic document based on the read CA certificate, the user does not need to manually sign the electronic document, thereby simplifying the complexity of the electronic signature operation;

On the other hand, because the CA certificate of the signer is pre-stored in the blockchain, and the CA certificate in the blockchain can only be uniformly used by the smart contract, an unauthorized third party cannot use the CA certificate of the signer to perform an electronic signature operation on an electronic document, thereby improving the security level when an electronic signature operation on the electronic document is performed.

Figure 4:
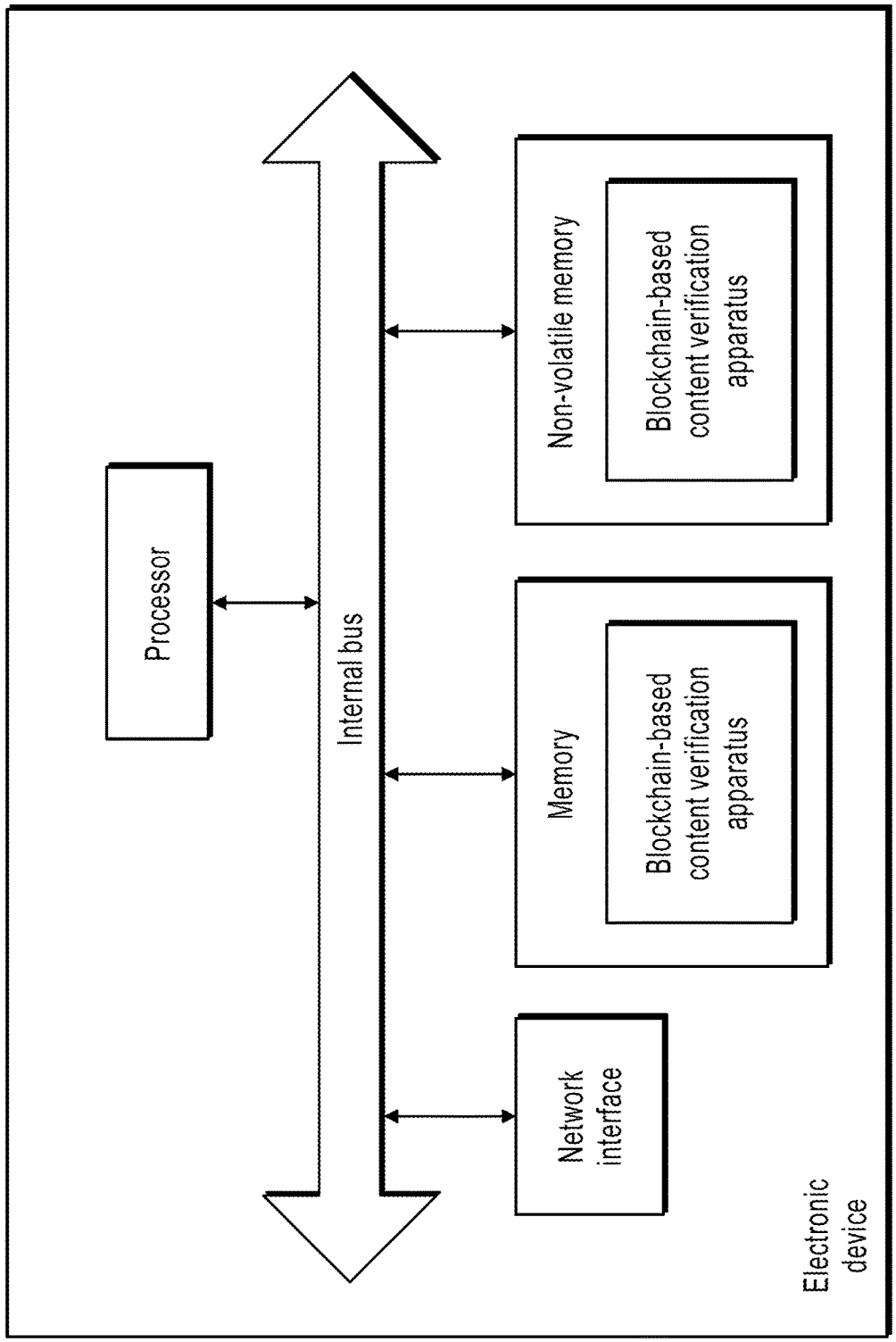
FIG. 4 is a schematic structural diagram illustrating an electronic device, according to an example implementation.

Corresponding to the previously described method implementations, the present specification further provides an implementation of a blockchain-based content verification apparatus. The implementation of the blockchain-based content verification apparatus in the present specification can be applied to electronic devices. The apparatus implementation can be implemented by using software, or can be implemented by using hardware or a combination of software and hardware. The software implementation is used as an example. As a logical apparatus, the software is developed when the corresponding computer program instructions in the non-volatile memory are read by the processor of the electronic device into the memory for execution. In terms of hardware, FIG. 4 is a diagram illustrating a hardware structure of an electronic device in which a blockchain-based content verification apparatus is located. In addition to a processor, a memory, a network interface, and a non-volatile memory shown in FIG. 4, the electronic device can generally include other hardware based on other actual functions of the electronic device. Details are omitted here for simplicity.

Figure 5:
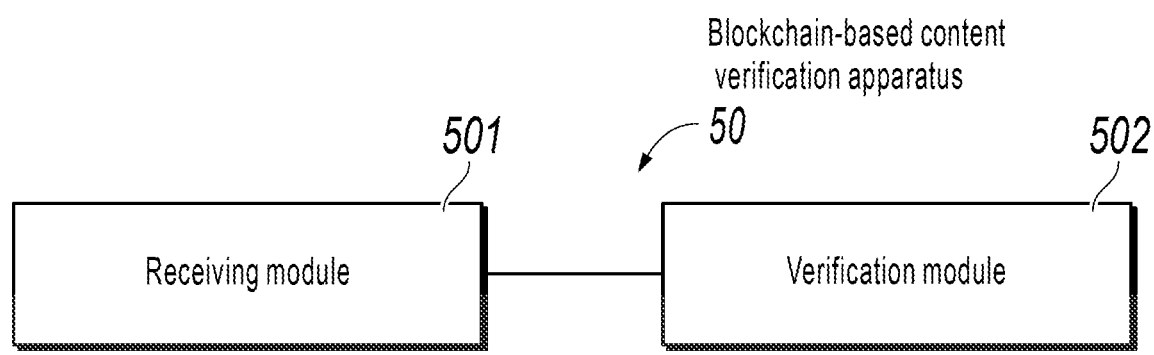
FIG. 5 is a logical block diagram illustrating a blockchain-based content verification apparatus, according to an example implementation.

FIG. 5 is a logical block diagram illustrating a blockchain-based content verification apparatus, according to an example implementation of the present specification.

Referring to FIG. 5, the blockchain-based content verification apparatus 50 can be applied to the electronic device shown in FIG. 3, and includes a receiving module 501 and a verification module 502.

The receiving module 501 is configured to receive a target transaction initiated by a signer through a client, where the target transaction is used to trigger online presentation of a target electronic document.

The verification module 502 is configured to: invoke a smart contract corresponding to content verification in response to the target transaction, execute a content verification program declared in the smart contract, and read original content of the target electronic document from a blockchain; and perform content verification on the target electronic document based on the read original content of the target electronic document, and return a content verification result and the original content of the target electronic document to the client for presentation to the signer.

In this implementation, the target transaction indicates that the signer has passed the identity authentication.

In this implementation, the original content of the target electronic document stored in the blockchain is preset with an access right for restricting access to a user account other than the smart contract.

In this implementation, the blockchain includes a main chain and a plurality of child chains; and the plurality of child chains include a first child chain for storing an access address and summary information of the target electronic document uploaded by a contract drafter, and a second child chain for storing the original content of the target electronic document.

The verification module 502 is configured to: read an access address of the target electronic document from the first child chain; and read the original content of the target electronic document from the second child chain based on the access address of the target electronic document.

In this implementation, the verification module 502 is further configured to: calculate summary information of the read original content of the target electronic document; and match calculated summary information with the summary information of the target electronic document read from the first child chain; if the two match, determine that the target electronic document has passed content verification; or if the two do not match, determine that the target electronic document has not passed the content verification.

In this implementation, the plurality of child chains further include a third child chain for storing a CA certificate corresponding to the signer, where the CA certificate is preset with an access right for restricting access to a user account other than the signer.

In this implementation, the target electronic document is an electronic contract.

For the detailed implementation process of the functions and purposes of the modules in the apparatus, references can be made to the implementation process of the corresponding steps in the method, and details are omitted here for simplicity.

Because the apparatus implementation basically corresponds to the method implementation, for the related parts, references can be made to the description of the method implementation. The previously described apparatus implementation is merely an example, where the units described as separate parts can or do not have to be physically separate, and components displayed as units can or do not have to be physical units, and can be located in one place or can be distributed on a plurality of network units. Based on the practical demands, some or all of these modules can be selected to implement the purpose of the present specification. A person of ordinary skill in the art can understand and implement the node device without paying creative work.

The system, apparatus, module, or unit illustrated in the previously described implementations can be implemented by using a computer chip or an entity, or can be implemented by using a product with a certain function. A typical implementation node device is a computer in the form of a personal computer, a laptop computer, a cellular phone, a camera phone, a smart phone, a personal digital assistant, a media player, a navigation node device, an e-mail transceiver, a game console, a tablet computer, a wearable node device, or any combination of several of these node devices.

Corresponding to the previously described method implementation, the present specification further provides an implementation of an electronic device. The electronic device includes a processor and a memory configured to store a machine executable instruction; the processor and memory are usually connected to each other through an internal bus. In other possible implementations, the node device can also include an external interface to communicate with other node devices or components.

In this implementation, by reading and executing the machine executable instructions that are stored in the memory and that correspond to a control logic for blockchain-based content verification, the processor is enabled to: receive a target transaction initiated by a signer through a client, where the target transaction is used to trigger online presentation of a target electronic document; invoke a smart contract corresponding to content verification in response to the target transaction, execute a content verification program declared in the smart contract, and read original content of the target electronic document from a blockchain; and perform content verification on the target electronic document based on the read original content of the target electronic document, and returning a content verification result and the original content of the target electronic document to the client for presentation to the signer.

In this implementation, the blockchain includes a main chain and a plurality of child chains; and the plurality of child chains include a first child chain for storing an access address and summary information of the target electronic document uploaded by a contract drafter, and a second child chain for storing the original content of the target electronic document.

By reading and executing the machine executable instructions that are stored in the memory and that correspond to a control logic for blockchain-based content verification, the processor is enabled to: read an access address of the target electronic document from the first child chain; and read the original content of the target electronic document from the second child chain based on the access address of the target electronic document.

In this implementation, by reading and executing the machine executable instructions that are stored in the memory and that correspond to a control logic for blockchain-based content verification, the processor is enabled to: calculate summary information of the read original content of the target electronic document; and match calculated summary information with the summary information of the target electronic document read from the first child chain; if the two match, determine that the target electronic document has passed content verification; or if the two do not match, determine that the target electronic document has not passed the content verification.

A person skilled in the art can easily figure out other implementations of the present specification after considering and practicing the present specification disclosed here. The present specification is intended to cover any variations, usage, or adaptations of the present specification that follow the general principles of the present specification and include common general knowledge or commonly used technical means in the art that are not disclosed in the present specification. The present specification and implementations are merely examples. The protection scope and spirit of the present specification are indicated by the following claims.

It should be understood that the present specification is not limited to the precise structures already described above and illustrated in the accompanying drawings, and various modifications and changes can be made without departing from the scope thereof. The protection scope of the present specification should be defined by the appended claims.

The above descriptions are merely preferred implementations of one or more implementations of the present specification, and are not intended to limit the present specification. Any modification, equivalent replacement, improvement, etc., made without departing from the spirit and principles of the present specification shall fall within the protection scope of the present specification.

What is claimed is:

1. A computer-implemented method for blockchain-based content verification, the method comprising:
   receiving, from a client device of a signer, a target transaction request for triggering presentation of a target electronic document;
   reading content of the target electronic document from a blockchain comprising a main chain and one or more child chains, wherein,
      the one or more child chains store an access address and summary information of the target electronic document uploaded by a contract drafter and the content of the target electronic document, and
      reading the content of the target electronic document from the blockchain comprises,
         reading the access address of the target electronic document from the one or more child chains, and
         reading the content of the target electronic document from the one or more child chains based on the access address of the target electronic document;
   performing content verification on the target electronic document based on the content of the target electronic document read from the blockchain; and
   returning the content of the target electronic document to the client device for presentation to the signer.

2. The computer-implemented method of claim 1, wherein the one or more child chains comprise:
   a first child chain that stores access addresses of electronic documents; and
   a second child chain that stores content of electronic documents.

3. The computer-implemented method of claim 2, wherein reading the content of the target electronic document from the blockchain comprises:
   reading the access address of the target electronic document from the first child chain; and
   reading the content of the target electronic document from the second child chain based on the access address of the target electronic document.

4. The computer-implemented method of claim 2, wherein the one or more child chains further comprise a third child chain for storing a certificate authority (CA) certificate corresponding to the signer, and wherein the CA certificate is preset with an access right for restricting access to a user account other than the signer.

5. The computer-implemented method of claim 1, wherein the main chain comprises a ledger for storing transaction data.

6. The computer-implemented method of claim 1, wherein performing content verification on the target electronic document based on the content of the target electronic document read from the blockchain comprises:
   calculating summary information of the content of the target electronic document read from the blockchain; and
   determining whether the calculated summary information matches the summary information of the target electronic document stored in the one or more child chains;
   when the calculated summary information matches the summary information of the target electronic document stored in the one or more child chains, determining that the target electronic document has passed content verification; and
   when the calculated summary information does not match the summary information of the target electronic document stored in the one or more child chains, determining that the target electronic document has not passed the content verification.

7. The computer-implemented method of claim 6, wherein:
   the summary information of the target electronic document stored in the one or more child chains comprises a first hash of original content of the target electronic document when the target electronic document was stored in the blockchain; and
   calculating the summary information of the content of the target electronic document comprises computing a second hash of the content of the target electronic document read from the blockchain.

8. A non-transitory, computer-readable medium storing one or more instructions executable by a computer system to perform operations comprising:
   receiving, from a client device of a signer, a target transaction request for triggering presentation of a target electronic document;
   reading content of the target electronic document from a blockchain comprising a main chain and one or more child chains, wherein,
      the one or more child chains store an access address and summary information of the target electronic document uploaded by a contract drafter and the content of the target electronic document, and
      reading the content of the target electronic document from the blockchain comprises,
         reading the access address of the target electronic document from the one or more child chains, and
         reading the content of the target electronic document from the one or more child chains based on the access address of the target electronic document;
   performing content verification on the target electronic document based on the content of the target electronic document read from the blockchain; and
   returning the content of the target electronic document to the client device for presentation to the signer.

9. The non-transitory, computer-readable medium of claim 8, wherein the one or more child chains comprise:
   a first child chain that stores access addresses of electronic documents; and
   a second child chain that stores content of electronic documents.

10. The non-transitory, computer-readable medium of claim 9, wherein reading the content of the target electronic document from the blockchain comprises:
   reading the access address of the target electronic document from the first child chain; and reading the content of the target electronic document from the second child chain based on the access address of the target electronic document.

11. The non-transitory, computer-readable medium of claim 9, wherein the one or more child chains further comprise a third child chain for storing a certificate authority (CA) certificate corresponding to the signer, and wherein the CA certificate is preset with an access right for restricting access to a user account other than the signer.

12. The non-transitory, computer-readable medium of claim 8, wherein the main chain comprises a ledger for storing transaction data.

13. The non-transitory, computer-readable medium of claim 8, wherein performing content verification on the target electronic document based on the content of the target electronic document read from the blockchain comprises:
  calculating summary information of the content of the target electronic document read from the blockchain; and
  determining whether the calculated summary information matches the summary information of the target electronic document stored in the one or more child chains;
  when the calculated summary information matches the summary information of the target electronic document stored in the one or more child chains, determining that the target electronic document has passed content verification; and
  when the calculated summary information does not match the summary information of the target electronic document stored in the one or more child chains, determining that the target electronic document has not passed the content verification.

14. The non-transitory, computer-readable medium of claim 13, wherein:
  the summary information of the target electronic document stored in the one or more child chains comprises a first hash of original content of the target electronic document when the target electronic document was stored in the blockchain; and
  calculating the summary information of the content of the target electronic document comprises computing a second hash of the content of the target electronic document read from the blockchain.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
  receiving, from a client device of a signer, a target transaction request for triggering presentation of a target electronic document;
  reading content of the target electronic document from a blockchain comprising a main chain and one or more child chains, wherein,
    the one or more child chains store an access address and summary information of the target electronic document uploaded by a contract drafter and the content of the target electronic document, and
    reading the content of the target electronic document from the blockchain comprises,
      reading the access address of the target electronic document from the one or more child chains, and
      reading the content of the target electronic document from the one or more child chains based on the access address of the target electronic document;
  performing content verification on the target electronic document based on the content of the target electronic document read from the blockchain; and
  returning the content of the target electronic document to the client device for presentation to the signer.

16. The computer-implemented system of claim 15, wherein the one or more child chains comprise:
  a first child chain that stores access addresses of electronic documents; and
  a second child chain that stores content of electronic documents.

17. The computer-implemented system of claim 16, wherein reading the content of the target electronic document from the blockchain comprises:
  reading the access address of the target electronic document from the first child chain; and
  reading the content of the target electronic document from the second child chain based on the access address of the target electronic document.

18. The computer-implemented system of claim 16, wherein the one or more child chains further comprise a third child chain for storing a certificate authority (CA) certificate corresponding to the signer, and wherein the CA certificate is preset with an access right for restricting access to a user account other than the signer.

19. The computer-implemented system of claim 15, wherein the main chain comprises a ledger for storing transaction data.

20. The computer-implemented system of claim 15, wherein performing content verification on the target electronic document based on the content of the target electronic document read from the blockchain comprises:
  calculating summary information of the content of the target electronic document read from the blockchain; and
  determining whether the calculated summary information matches the summary information of the target electronic document stored in the one or more child chains;
  when the calculated summary information matches the summary information of the target electronic document stored in the one or more child chains, determining that the target electronic document has passed content verification; and
  when the calculated summary information does not match the summary information of the target electronic document stored in the one or more child chains, determining that the target electronic document has not passed the content verification.

21. The computer-implemented system of claim 20, wherein:
  the summary information of the target electronic document stored in the one or more child chains comprises a first hash of original content of the target electronic document when the target electronic document was stored in the blockchain; and
  calculating the summary information of the content of the target electronic document comprises computing a second hash of the content of the target electronic document read from the blockchain.

* * * * *